(12) United States Patent
DuPont

(10) Patent No.: US 7,601,411 B2
(45) Date of Patent: Oct. 13, 2009

(54) LAMINATED PRESSURE SENSITIVE ADHESIVE TAPE FOR CORRUGATED HANDLE REINFORCEMENT

(75) Inventor: Dean Thomas DuPont, Rockford, MI (US)

(73) Assignee: tesa SE, Hamburg (DE)

( * ) Notice: Subject to any disclaimer, the term of this patent is extended or adjusted under 35 U.S.C. 154(b) by 581 days.

(21) Appl. No.: 11/538,162

(22) Filed: Oct. 3, 2006

(65) Prior Publication Data

US 2008/0081171 A1   Apr. 3, 2008

(51) Int. Cl.
*B32B 9/00* (2006.01)
*B32B 33/00* (2006.01)

(52) U.S. Cl. .......... 428/41.3; 428/40.1; 428/41.8; 428/113; 428/297.7; 428/299.4; 428/299.7; 428/300.7; 428/343; 428/500

(58) Field of Classification Search .......... 428/40.2, 428/41.3, 41.8, 41.7, 113, 297.7, 299.4, 299.7, 428/300.7, 343, 500
See application file for complete search history.

(56) References Cited

U.S. PATENT DOCUMENTS

| 3,629,047 A | 12/1971 | Davison |
| 4,309,487 A | 1/1982 | Holmes |
| 5,190,798 A | 3/1993 | Bloch |

FOREIGN PATENT DOCUMENTS

| AU | 73555/74 | 9/1974 |
| EP | 1 829 948 A2 | 9/2007 |
| WO | 2005 028200 A1 | 3/2005 |

*Primary Examiner*—Michael C Miggins
(74) *Attorney, Agent, or Firm*—Norris McLaughlin & Marcus, P.A.

(57) ABSTRACT

A laminated tape for reinforcing handles of a corrugated container. The laminated tape comprises one or more upper polyolefin film layers and one or more lower polyolefin film layers with one or more fiber layers between the upper and lower polyolefin film layers. At least one polyolefin film layer may be a mono-axially oriented polypropylene.

20 Claims, 2 Drawing Sheets

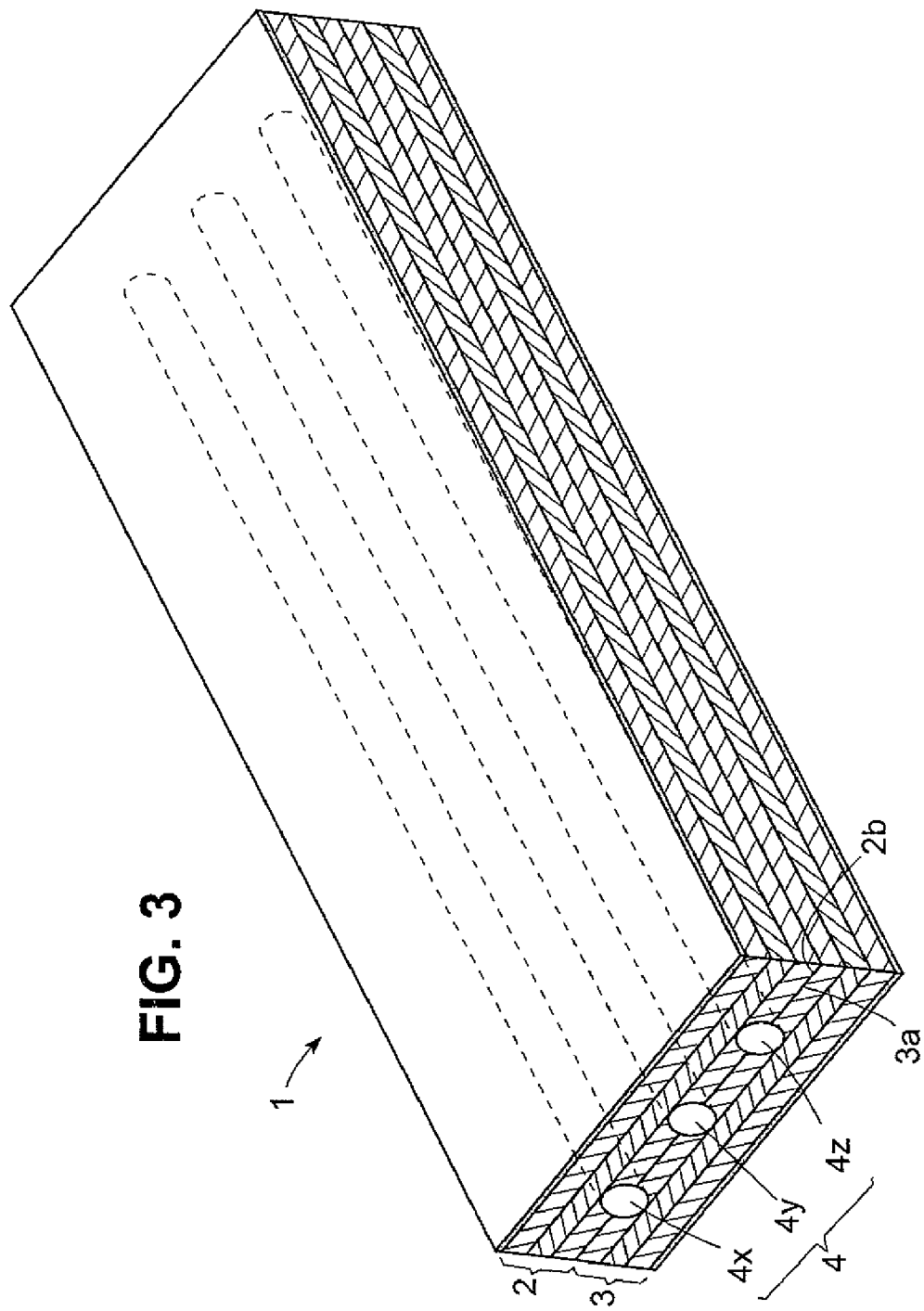

LAMINATED PRESSURE SENSITIVE ADHESIVE TAPE FOR CORRUGATED HANDLE REINFORCEMENT

BACKGROUND OF THE INVENTION

1. Field of the Invention

The invention pertains to a laminated pressure sensitive adhesive tape having particular utility for the reinforcement of corrugated container handles. The laminated pressure sensitive adhesive tape comprises one or more upper layers and one or more lower layers of polyolefin film with one or more layers of fiber material between the upper and lower layers. A pressure sensitive adhesive is applied to the bottom surface of the lower layers of polyolefin film and a release coating may be applied to the top surface of the upper layers of polyolefin film. The laminated pressure sensitive adhesive tape is applied to handles of a corrugating container to provide additional strength to the corrugated container at the most critical load concentration area during container handling.

2. The Related Art

Fiberboard corrugated containers are used with a wide variety of articles. Depending on the nature of the article and the intended use for the corrugated containers having one or more handles on or near the top of the container is convenient and may be necessary for effective movement of the container by hand or machine. When a handle is located on or near the container top, a person may carry the container, and articles in the container, with one hand while maintaining the other hand free. In any event, the container handle is a critical load concentration area and without adequate strength could break. Handles of a fiberboard container that break inconvenience a person carrying the container, and if the container is actually dropped, articles inside the container may be damaged.

Different solutions have been proposed to remedy the problem of handle breakage for fiberboard corrugated containers. One proposed solution is to provide the container with one or more handles made from alternative materials. Also, alternative materials and extra fiberboard have been used to reinforce the handles. These solutions to the problem are imperfect and may add to the cost of the container. A solution to the problem which adds minimal cost to the container and allows for reinforcement of the handle only when necessary depending on the size and nature of the intended contents of the container would likely be preferred in the art.

Applying tape to the handle would provide reinforcement to the handle of the corrugated container. Tear propagation resistance, however, may limit the types of tapes that can effectively reinforce corrugated container handles. Thus, a tape which has the appropriate tear propagation resistance to effectively reinforce corrugated container handles to provide extra strength to this load concentration area during handling is desired.

SUMMARY OF THE INVENTION

The invention pertains to a laminated tape having particular utility for reinforcing handles of corrugated containers. The term container as used herein is intended to have the broadest possible scope and includes corrugated containers, packaging and boxes of all shapes and sizes. Additionally, the concept of handles as used herein is intended to have the broadest possible definition and include a member of a corrugated container which is at, near or extends from any surface of the corrugated container that allows for a person to place his or her hand into an opening to lift and carry the corrugated container, or allows for an inanimate object to be placed therein to lift and move the corrugated container. The term handle is also intended to include openings or voids on any surface of the corrugated container, such as on one or more sides of the corrugated container, that allow for the insertion of a human hand or an inanimate object to lift, move and/or carry the corrugated container, like hand holes on one or more sides of the corrugated container.

The tape is made of a laminated structure sandwiching fibers between two layers polyolefin film bound together with a laminating adhesive. The laminated tape of the invention generally comprises one or more upper polyolefin film layers, one or more fiber layers and one or more lower polyolefin film layers. The one or more fiber layers are between the one or more upper polyolefin film layers and the one or more lower polyolefin film layers. For example, the one or more upper polyolefin film layers has an uppermost layer having a top surface and a lowest layer having a bottom surface and, likewise, the one or more lower polyolefin film layers has an uppermost layer having a top surface and a lowest layer having a bottom surface. The one or more fiber layers are between the bottom surface of the lowest layer in the upper polyolefin film layers and the top surface of the uppermost layer of the lower polyolefin film layers. The individual layers of each component of the laminated tape are held together by laminating adhesive.

The laminated tape comprises a pressure sensitive adhesive having adherence to corrugated material. The pressure sensitive adhesive is generally applied at the bottom of the tape structure, such as being applied to the bottom surface of the lowest layer of the lower polyolefin film layers. Optionally, a release coating is applied to one side of the tape structure, such as at the top surface of the uppermost layer of the upper polyolefin film layers.

The tape is particularly useful for reinforcing handles on a corrugating container. The tape is generally applied during the manufacture of a corrugated container, for example, being applied by a pressure roller directly to corrugated board in the general area of the handles. Also, the tape may be an aftermarket product and applied after the corrugated container is made or formed.

DETAILED DESCRIPTION OF THE DRAWING

FIG. 3 is a perspective view of a laminated pressure sensitive adhesive tape in accordance with an embodiment of the invention wherein the fiber layer comprises fiber strands.

DETAILED DESCRIPTION OF THE INVENTION

Figure 1:
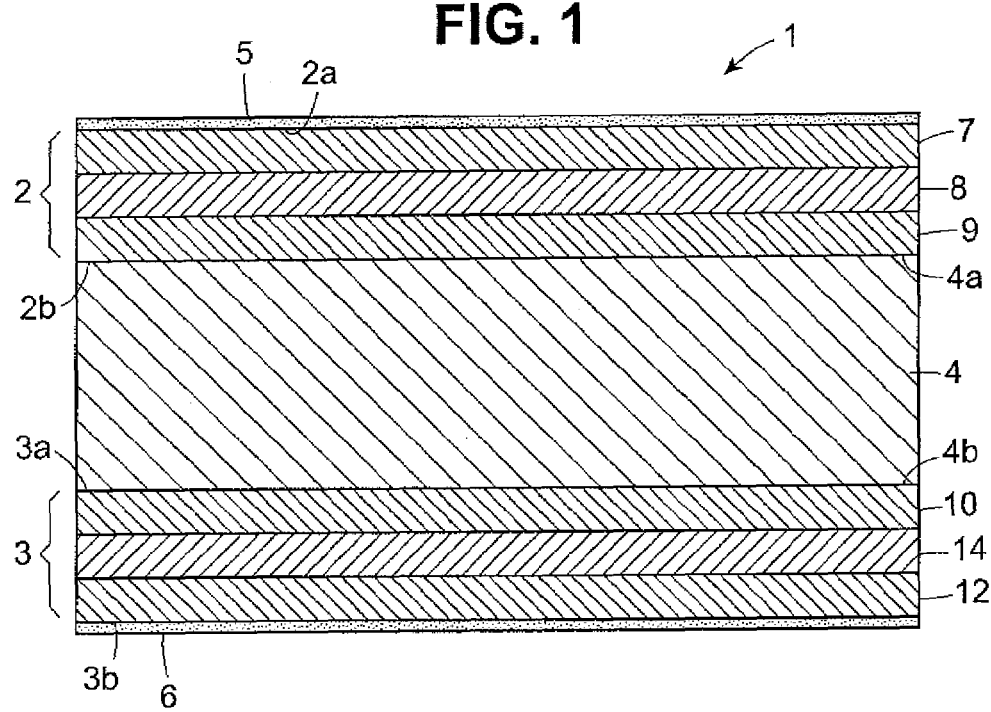
FIG. 1 is a cross-sectional view of a laminated pressure sensitive adhesive tape in accordance with an embodiment of the invention, wherein the upper polyolefin film layers are comprised of multiple films and the lower polyolefin film layers are comprised of multiple films.

Referring to FIG. 1, in an embodiment of the invention, the laminated pressure sensitive adhesive tape 1 comprises upper polyolefin film layers 2, lower polyolefin film layers 3 and a fiber layer 4. The upper film polyolefin layers 2 have a top surface 2a and a bottom surface 2b, the lower polyolefin film layer 3 has a top surface 3a and a bottom surface 3b and the fiber surface has a top surface 4a and a bottom surface 4b. The laminated tape is structured such that the bottom surface 2b of the upper polyolefin film layers 2 is juxtaposed with the top surface 4a of the fiber layer and the top surface 3a of the lower polyolefin film layers is juxtaposed with the bottom surface 4b of the fiber layer 4. The laminated pressure sensitive adhesive tape 1 further comprises a pressure sensitive adhesive 6 applied to the bottom surface 3b of the lower polyolefin film layers 3 and optionally a primer may be coated onto the bottom surface 3b prior to the application of the pressure sensitive adhesive. Optionally, the laminated pressure sensitive adhesive tape 1 has a release coating 5 applied to the top surface 2a of the upper polyolefin film layers 2.

FIG. 1 shows the upper polyolefin film layers comprised of three polyolefin films (7, 8, 9) and the lower polyolefin film layers comprised of three polyolefin films (10, 11, 12). Although the tape is shown in FIG. 1 as having three film layers in both in the upper polyolefin film layers and lower polyolefin film layers, the invention encompasses any number or combination of polyolefin film layers such as 1, 2, 3, 4, 5, 6, 7, 8, 9, 10 or more polyolefin film layers in the upper polyolefin film layers and/or lower polyolefin film layers. When the upper polyolefin film layers and/or lower polyolefin film layers comprise multiple polyolefin films, laminating adhesive is used to secure the separate polyolefin films in each layer together.

Figure 2:
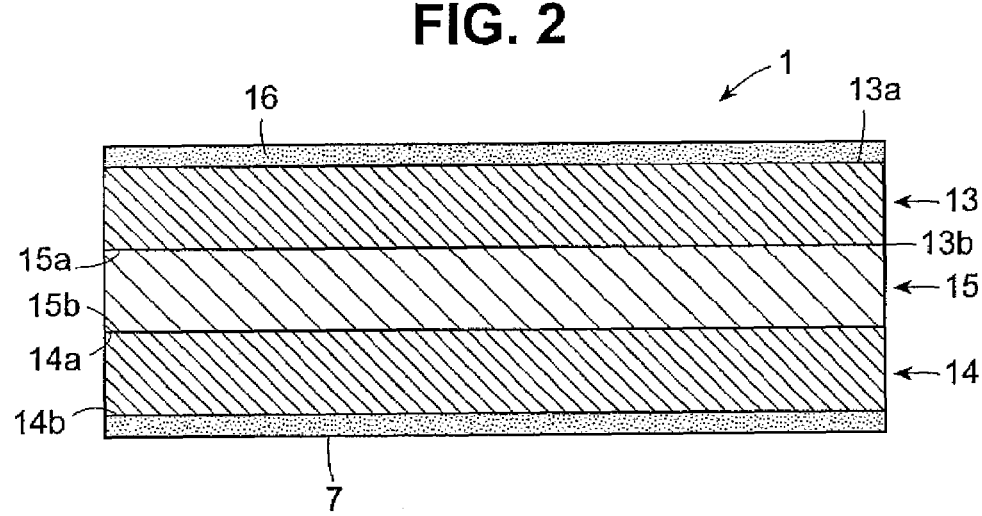
FIG. 2 is a cross-sectional view of a laminated pressure sensitive tape in accordance with an embodiment of the invention comprising a single upper polyolefin film layer and a single lower polyolefin film layer.

In an embodiment of the invention the upper polyolefin film layers may be a single or one film and/or the lower polyolefin film layers may be a single or one film. For example, as shown in FIG. 2, the laminated pressure sensitive adhesive tape 1 may comprise a single upper polyolefin film layer 13, a single lower polyolefin film layer 14 and a fiber layer 15. The upper polyolefin film layer 13 has a top surface 13a and a bottom surface 13b, the lower polyolefin film layer 14 has a top surface 14a and a bottom surface 14b and the fiber layer 15 has a top surface 15a and a bottom surface 15b. The laminated tape is structured such that the bottom surface 13b of the upper polyolefin film layer 13 is juxtaposed with the top surface 15a of the fiber layer 15 and the top surface 14a of the lower polyolefin film layer 14 is juxtaposed with the bottom surface 15b of the fiber layer 15. In the embodiment of the invention shown in FIG. 2, the laminated pressure sensitive adhesive tape further comprises a release coating 16 at the top surface 13a of the upper polyolefin film layer 13 and a pressure sensitive adhesive 17 at the bottom surface 14b of the lower polyolefin film layer 14 and, optionally, a primer may be coated onto the bottom surface 14b prior to the application of the pressure sensitive adhesive. The upper polyolefin film layer 13, lower polyolefin film layer 14 and fiber layer 15 are bound together with laminating adhesive. The upper polyolefin film layer 13 and lower polyolefin film layer 14 may have a thickness of between about 10 microns and about 120 microns including about 48 microns and about 120 microns. In embodiments of the invention wherein the upper polyolefin film layers and/or lower polyolefin film comprise multiple (i.e., 2 or more) separate polyolefin films, such as shown in FIG. 1, each separate polyolefin film may have a thickness between about 10 microns and about 120 microns including about 48 microns and about 120 microns.

The fiber layer may comprise one or more fiber strands, which may be distinct strands of fiber material such that the laminated structure of the tape has first polyolefin film layers and second polyolefin film layers with the fiber layer being one or more distinct strands of fiber material, such that the bottom surface of the upper polyolefin film layers and top surface of the lower polyolefin film layers are juxtaposed and touching each other except where the fiber strands are interspersed between the polyolefin film layers, at which locations the bottom surface of the upper polyolefin film layers and top surface of the lower polyolefin film layers are in contact with the fiber layer. This is shown in FIG. 3 wherein the fiber layer 4 comprises fiber strands which are distinct strands in that none of the fiber strands touch another fiber strand along the width of the tape. It should be noted that although three fiber strands (4x, 4y, 4z) are shown in FIG. 3 as comprising the fiber layer 4, the laminated pressure sensitive adhesive tape may have any number of fiber strands, such as 1, 2, 3, 4, 5, 6, 7, 8, 9, 10 or more depending on the characteristics of the tape required for an intended application as described below. Also, the fiber layer in the embodiment of the invention shown in FIG. 2 may be comprised of one or more fiber strands.

Polyolefin used in the polyolefin film layers include copolymers of ethylene and polar monomers such as styrene, vinyl acetate, methyl methacrylate, butyl acrylate or acrylic acid; homopolymers such as polyethylene, like HDPE, LDPE, MDPE; copolymers of ethylene with a further olefin such as propene, butene, hexene or octene (for example LLDPE, VLDPE); polypropylenes (for example, polypropylene homopolymers, random polypropylene copolymers or block polypropylene copolymers) and polyesters.

The film may be unoriented, however, in an embodiment of the invention a mono-axially oriented polypropylene ("MOPP") is used, and, in this embodiment, at least one polyolefin film in the tape structure is MOPP. As such, at least one of the films in the upper polyolefin film layers and/or lower polyolefin film layers is MOPP. In an embodiment of the invention, all of the films which comprise the upper polyolefin film layers and/or lower polyolefin film layers are MOPP. In embodiments of the invention where not all of the layers are MOPP other polyolefin film layers are made from any other polyolefin material, such as those discussed above and are preferably polyethylene, polyester or polypropylene. In the embodiment of the invention shown in FIG. 1, either one or more of the film layers in the upper polyolefin film layers 2 or one or more of the film layers in the lower polyolefin film layers 3 may be MOPP and the film layers that are not MOPP may be made from another polyolefin material. Preferably, one or more film layers in the lower polyolefin film layer 3 comprises the MOPP so that the MOPP is closest to the pressure sensitive adhesive 6. In further embodiments of the invention, both the upper polyolefin film layers and lower polyolefin film layers are MOPP or each comprise at least one film, or all films, that are MOPP. In an embodiment of the invention, such as that shown in FIG. 2, either the upper polyolefin layer 13 or lower polyolefin layer 14 may be MOPP, preferably the lower polyolefin film layer 14 which is closest to the pressure sensitive adhesive 17.

MOPP films have a high tensile strength in the longitudinal direction which enhances the tear resistance of the laminated tape. Also, the relatively rigid and flat surface of the MOPP, particularly when a component of the lower polyolefin film layers, minimizes the amount of adhesive required to properly wet out the corrugated surface when the laminated pressure sensitive adhesive tape is adhered to a corrugated container. Any polyolefin film layers which are not from a MOPP material functions to provide support to the fiber layer.

The fiber provides longitudinal strength reinforcement to the laminated tape and functions as a rip stop in case the tape is notched, such as in the handle die cutting process. The MOPP layer is longitudinally strong but is very weak in nick resistance and, as such, if nicking occurs, the fiber will stop tear propagation through the tape. Thus, the combination of the MOPP and fiber in the laminated pressure sensitive adhesive tape provide a tape adapted for reinforcement to the handle of a corrugated container and, thus, provides a cost effective solution to the problem of handle breakage.

Various fiber materials may be used in the one or more layers of fiber and, as discussed above, the fiber layer may be comprised of discrete fiber strands. For example, the fiber layer or strands can be made from polyester, polypropylene or fiberglass. In a preferred embodiment the laminated tape comprises monofilament fibers, including monofilament fibers that are twisted to form single strands. The monofilament material supplements the longitudinal strength of the laminated tape. The selection of material for the fiber is generally a function of economics, strength requirements, and strand diameter constraints. The number of twisted strands varies with the finished width of the tape and is a function of filament type and load requirements.

The tape is generally applied to corrugated board or a continuous sheet of corrugated board, either at the time the corrugated sheet is made or at the time the corrugated sheet is made into container material. The tape may also be applied to the handles of a corrugated container after the box is made or formed.

In a preferred embodiment of the invention, the laminated pressure sensitive adhesive tape is applied during the manufacture of the corrugated container. Typically a continuous sheet of corrugated material is die cut into the shape that becomes the final container when glued and folded and, generally, flaps and handles are die cut during this process. The laminated tape is applied to the continuous corrugated sheet in the area where the handles are to be cut, prior to the die cutting of the openings for the handles. A method for making corrugated containers having reinforced handles with the laminated pressure sensitive adhesive tape of the invention comprises the steps of providing a continuous corrugated sheet comprising one or more surfaces, such as a first surface and a second surface with a thickness of corrugated material there between, applying the laminated pressure sensitive adhesive tape in an area of at least one of the surfaces where an opening for handles are planned, which opening extends from the first surface to the second surface, and die cutting the opening. In a preferred embodiment, the tape is unwound from a traverse wound spool or flat roll and applied with a pressure roller to the continuous corrugated sheet in the general area of the handles. The application assembly may be an unwind roller with a brake or clutch, guide rollers and a pressure nip. The applicator assembly could further include a turret and accumulator device to allow for continuous operation during tape spool or roll changes. Laying the tape on the corrugated sheet under a pressure nip allows tape application speed to match the line speed at the corrugator so that application of the tape does not materially effect line speed operations. After application of the tape, the corrugated sheet with one or more strips of tape are then cut with a die into an unfolded box shape at which time the handles are cut. The box is then ready for final assembly and packing by the customer.

The precision of tape placement in relation to the handle opening determines the probability of the die hitting the tape when the handle opening is made by the corrugator. Generally, sufficient strands must remain in the un-notched portion of the cut corrugated board to maintain strength of the laminated tape.

The fiber strands provide tear resistance in the event the tape is nicked during the corrugated container manufacturing process, such as in the die cutting procedure, and the number of fiber strands in the tape should be so that a critical mass remains after manufacture. Generally, during manufacture of a corrugated container, the tape can be cut up to 20% of its total width and, thus, fiber count and spacing preferably should maintain strength after this cut. By way of non-limiting example, if three fiber strands are deemed necessary for strength and elongation requirements for the intended use of the tape and/or finished corrugated container, then three strands should remain after manufacture and die cutting of the handles, such that the tape should have at least 20 percent more than 3 fibers, like at least 4 or more fibers. Accordingly, in an embodiment of the invention, the number of fiber strands are at least about 1.2 times the amount of fiber strands required to maintain the strength requirement for the laminated pressure sensitive adhesive tape.

The structure of the laminated tape is held together by a laminating adhesive with enough bond strength to withstand delaminating under load. For example, in the embodiment of the invention shown in FIGS. 1 and 2 a dry bond adhesive may be applied to the bottom surface (2b, 13b) of the upper polyolefin film layer(s) and/or the top surface (3a, 14a) of the lower polyolefin film layer(s) with the fibers forming the fiber layer 4 laid onto the bottom surface (2b, 13b) of the upper polyolefin film layer(s) and/or the top surface (3a, 14a) of the lower polyolefin film layer(s) and the upper polyolefin film layer(s) and lower polyolefin film layer(s) are heat pressed together. For example, the polyolefin film layer(s) not having the fibers is heat pressed onto the polyolefin film layer(s) with the fibers. Laminating adhesives which sufficiently wet the fibers and film to provide a strong internal bond may be used. Acrylic emulsion adhesives are preferred to minimize coating thickness.

The laminated tape comprises a pressure sensitive adhesive which is generally applied to the bottom of the tape structure, such as at the bottom surface of the lowest layer of the one or more lower polyolefin film layers. In the embodiment of the invention shown in FIGS. 1 and 2, for example, the pressure sensitive adhesive (6, 17) is applied to the bottom surface (3b, 14b) of the lower polyolefin film layer(s) (3, 14). The pressure sensitive adhesive must wet out sufficiently on the corrugated surface to prevent the laminated tape from releasing during load. A tacified solvent based rubber or acrylic based (synthetic rubber) adhesive may be used. The pressure sensitive adhesive may be a blend of natural rubbers and/or synthetic rubbers, it being possible for the natural rubber or rubbers to be selected in principle from all available grades, such as, for example, crepe, RSS, ADS, TSR or CV grades, depending on required purity and viscosity level, and for the synthetic rubber or rubbers to be selected from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes and/or blends thereof. The adhesive may also comprise about 10% to about 50% thermoplastic elastomers by weight based on the total elastomer fraction in the adhesive. For example, styrene-isoprene-styrene (SIS) and styrene-butadiene-styrene (SBS) grades may be used.

The laminated tape may optionally comprise a release coating generally applied to the top of the laminated tape structure, such as at the top surface of the uppermost layer of the one or more upper polyolefin film layers. In the embodiment of the invention shown in FIGS. 1 and 2, the release coating (5, 16) is applied to the top surface (2a, 13a) of the upper polyolefin film layer(s) (2, 13). Release coatings are generally based on polymers and copolymers prepared from monomers, such as alkylacrylates and alkylmethacrylates, vinylacetate, vinylchloride and acrylonitrile and combinations thereof. The release coating used in the laminated pressure sensitive adhesive tape may be selected based on the unwind characteristics required for the application machinery. For example, silicone based release materials are preferred when an easy unwind feel is needed by the applicator and carbamate type release materials are used whenever an easy unwind feel is not desired or required. Preferably, platinum catalyzed silicone based release agents are used for the laminated pressure sensitive adhesive tape.

In a preferred method of manufacture, the laminated pressure sensitive adhesive tape is made by a two step process where the film is made on one machine and the release and adhesive coatings are applied on another. The composite film is made on a conventional laminating machine which is fitted to lay down filament strands onto a web before lamination. In the embodiment of the invention where one of the polyolefin film layers is MOPP, such as the lower polyolefin film layer, the MOPP (e.g. carrier film) is first coated generally on its top surface when laminated onto the tape structure with a laminating adhesive which is typically an acrylic emulsion. The adhesive is dried and then the fiber layer, such as fiber strands, are placed on the coated side in the spacing desired for the final tape. The MOPP with the fiber layer then goes through a laminating station, where the other polyolefin film layer is applied to seal the fiber layer between the upper polyolefin film layer and lower polyolefin film layer. The composite film is rolled up and transported to a standard coating machine where the release coat, primer (if the adhesive so requires) and pressure sensitive adhesive are applied and cured. In a particularly preferred method, the lower polyolefin film layer, or one of the films of the lower polyolefin film layers, is MOPP which is coated on one side generally the top surface with a laminating adhesive and after the laminating adhesive dries one or more fiber strands are placed on the side of the MOPP layer coated with the adhesive and then an upper polyolefin film layer(s) is applied in the laminating machine to seal the one or more fiber strands between the upper polyolefin layer(s) and lower polyolefin layer(s). The finished material may be a wide web roll ready for slitting into customer specified widths.

The laminated tapes described herein may be used in a method of reinforcing handles of a corrugated container made of corrugated board having handle cut-outs. The method comprises providing any of the laminated tapes described herein and applying the tape to the corrugated board proximate to the handle cut outs. The corrugating container having handle cut outs comprises the laminated pressure sensitive adhesive tape described herein proximate to the location of the handle cut-outs.

EXAMPLES 1-9

A composite roll was made in a laminating machine incorporating 4 different types of filaments (i.e., fiber) (two each of polypropylene ("PP") and glass) in two patterns each designated as A, B, C and D in Table 1. The patterns had 2, 3 or 4 strands in a tape per ¾ inch with a final width of 19 millimeters. This master composite roll was then slit into nine separate rolls for testing. A lower polyolefin film layer of 48 micron thick MOPP similar to the NOPI brand strapping tapes made with an impact copolymer resin was first coated with an acrylic emulsion laminating adhesive and allowed to dry. After the laminating adhesive dried, the various fiber strands were simultaneously placed on the coated side of the MOPP layer to have 2, 3 or 4 strands every 19 millimeters. The MOPP lower polyolefin film layer with the fiber strands was then fed through the laminator to apply a 10 micron polyethylene upper polyolefin film layer to form the laminated structure of the tape. The laminated structure of the tape was then fed to a coating machine where a platinum catalyzed silicone based release agent available from WACKER Chemie AG was applied to the top surface of the upper polyolefin film layer and a solvent based pressure sensitive adhesive compounded from SIS rubber and hydrocarbon tackifying resins was applied to the bottom surface of the lower polyolefin film layer. The pressure sensitive adhesive was cured by heating in nitrogen inerted ovens at temperatures not exceeding 105° C. until all of the solvent was removed. This large composite roll was then slit into individual 19 millimeter wide rolls using a Guzzetti slitting machine slit and rolled onto individual cores to make a standard roll of tape. The end result was nine rolls of tape each being 19 millimeters wide having the filament type and configuration listed in Table 1, to provide the nine separate laminated pressure sensitive adhesive tapes of Example 1-9.

At least one piece of tape from each example, i.e., roll, was tested for tensile strength, elongation, 90° peel adhesion SS and rolling ball tack by applying current ASTM testing standards. The specific methods used were ASTM D 3759 for tensile strength and elongation, ASTM D 3330 for peel adhesion and ASTM D 3121 for rolling ball tack. ASTM D 3759, ASTM D 3330 and ASTM D 3121 are all incorporated herein by reference in their entirety. The test results are set forth in Table 1.

TABLE 1

| | Example | | | | | | | | |
|---|---|---|---|---|---|---|---|---|---|
| | 1 | 2 | 3 | 4 | 5 | 6 | 7 | 8 | 9 |
| Filament Type | PP "A" | PP "A" | PP "A" | PP "B" | PP "B" | Glass "C" | Glass "C" | Glass "D" | Glass "D" |
| # of Filaments per ¾ inch | 2 | 3 | 4 | 4 | 3 | 3 | 4 | 3 | 4 |
| Tensile, N/cm | 33.2 | 34.7 | 40.5 | 39.3 | 43.3 | 73.7 | 85.5 | 63.9 | 80.4 |
| Elongation, % | 32.9 | 76.0 | 32.0 | 54.5 | 24.9 | 5.7 | 6.5 | 6.4 | 6.1 |
| 90° Peel Adhesion, SS N/cm | 5.9 | 7.1 | 6.1 | 8.5 | 6.4 | 6.0 | 5.9 | 6.4 | 5.6 |
| Rolling Ball Tack, cm | 3 | 3 | 3 | 2 | 3 | 3.5 | 1.7 | 5.2 | 4.5 |

EXAMPLE 10

The laminated pressure sensitive adhesive tape comprising MOPP and having an upper polyolefin layer and a lower polyolefin layer with three fiber strands forming a fiber layer was tested in an application simulating practical conditions experienced by a case of beer in the market place. A case of 24, 12 ounce beer bottles in a corrugated container was purchased in a commercial market place. The beer bottles were removed from the corrugated container and the container was unglued and disassembled so that the corrugated container could be opened flat. Strips of the laminated pressure sensitive adhesive tape were applied to the inside surface of the corrugated container at least on one of the sides of the container opposite from the existing hand holes of the corrugated container. After the tape was applied, a die cut tool was used to punch new hand holes adjacent to the applied laminated pressure sensitive adhesive tape in the corrugated container in a manner to simulate a production method customarily applied for making hand holes in corrugated containers. Whereas the existing hand holes of the corrugated container were at the top of the container, the new hand holes with the laminated pressure sensitive adhesive tape on the inside of surface of the corrugated container were on the sides of the container at the bottom. The corrugated container was then re-assembled and the unopened 24, 12 ounce beer bottles were placed back into the corrugated container oriented such that the new hand holes with the laminated pressure sensitive adhesive tape were located on what became the top of the container for testing purposes (which was the bottom of the container when the beer was purchased in the market place).

The re-assembled and reloaded corrugated container was first subjected to a drop test to simulate the bouncing motion that the corrugated container would experience when a case of beer is carried by a person using hand holes. The corrugated container was placed onto a table having two cradles for insertion into the hand holes with separate wires attached at one end to the cradles and attached at the other end to springs. The springs are attached to a cross member of the table and the table has two opposed trays which can pivot away from each other. One cradle was placed into one of the new hand holes on the corrugated container and the other cradle was placed into the other new hand hole with the corrugated container placed on the opposed trays. The opposed trays were then pivoted away from each other allowing the corrugated container to drop while being held by the cradles. Because of the springs, after dropping, the corrugated container bounces without hitting floor imitating bouncing that would be experienced if a person placed each hand in a separate hand hole and walked with the corrugated container of beer. Success in the drop test is 30 bounces without failure, and the hand holes with the laminated pressure sensitive adhesive tape passed 54 bounces without failure.

The re-assembled and reloaded corrugated container was then subjected to a pull test to simulate the motion of a stock person or consumer pulling a corrugated container with 24, 12 ounce bottles of beer off a shelf or stack. The corrugated container was placed on an elevated platform so that the hand holes were about knee high to the person performing the test. The person performing the test then placed one hand through one of the hand holes and then slightly lifted the corrugated container from the platform while sliding the corrugated container off the platform by swinging his arm in a backwards motion. The corrugated container was placed back onto the platform with the motion repeated a number of times. Success in the pull test is 6 swings (i.e. removing the corrugated container from the platform six times), and the tested corrugated container having hand holes with the laminated pressure sensitive adhesive tape passed the pull test with 6 swings.

What is claimed is:

1. A laminated tape for reinforcing handles of corrugated containers comprising one or more upper polyolefin film layers having an uppermost layer with a top surface and a lowest layer with a bottom surface, one or more lower polyolefin film layers having an uppermost layer with a top surface and a lowest layer with a bottom surface and one or more fiber layers between the bottom surface of the lowest layer of the upper polyolefin film layers and the top surface of the uppermost layer of the lower polyolefin film layers wherein at least one layer of polyolefin film is mono-axially oriented polypropylene ("MOPP").

2. The laminated tape of claim 1 further comprising an acrylic emulsion laminating adhesive.

3. The laminated tape of claim 1 wherein the polyolefin films that are not MOPP are made from a polyolefin selected from the group consisting of copolymers of ethylene and polar monomers, polyethylene, copolymers of ethylene and another olefin, polypropylene homopolymers, random polypropylene copolymers, block polypropylene copolymers and polyesters.

4. The laminated tape of claim 1 wherein at least one layer of the lower polyolefin film layers is MOPP and the upper polyolefin layers are not MOPP.

5. The laminated tape of claim 1 in the form of a wide web roll.

6. A method for making a corrugated container having reinforced handles comprising the steps of providing a continuous corrugating sheet having one or more surfaces, applying the laminated tape of claim 1 to at least one of the surfaces in an area of the surface where an opening for a handle is planned and die cutting the opening.

7. A corrugated container having handle cut outs comprising the tape of claim 1 proximate to the handle cut outs.

8. A method of reinforcing handles of a corrugated container made from corrugated board having handle cut-outs comprising the step of applying the laminated tape of claim 1 to the corrugated board proximate to the location of the handle cut-outs.

9. The laminated tape of claim 1 further comprising a pressure sensitive adhesive.

10. The laminated tape of claim 9 wherein the pressure sensitive adhesive is tacified solvent based rubber or acrylic based.

11. The laminated tape of claim 1 further comprising a release coating.

12. The laminated tape of claim 11 wherein the release coating is platinum catalyzed silicone based.

13. The laminated tape of claim 1 wherein the fiber layer comprises one or more fiber strands.

14. The laminated tape of claim 13 wherein the fiber strands are made from polyester, polypropylene or fiberglass.

15. The laminated tape of claim 13 wherein the fiber strands comprise monofilament fibers twisted to form single strands.

16. The laminated tape of claim 13 wherein the number of fiber strands is at least about 1.2 times the amount of fiber strands required to maintain the strength requirement for the laminated tape.

17. The laminated tape of claim 1 comprising a single upper polyolefin film layer having a top surface and a bottom surface and a single lower polyolefin layer film having a top surface and a bottom surface.

18. The laminated tape of claim 17 further comprising a pressure sensitive adhesive at the bottom surface of the lower polyolefin layer.

19. The laminated tape of claim 17 wherein the fiber layer comprises one or more fiber strands.

20. The laminated tape of claim 17 wherein the lower polyolefin layer is MOPP and the upper polyolefin layer is made from a material other than MOPP.

* * * * *